(12) United States Patent
Lim et al.

(10) Patent No.: US 6,400,727 B1
(45) Date of Patent: Jun. 4, 2002

(54) METHODS AND SYSTEM TO TRANSMIT DATA ACQUIRED AT A VARIABLE RATE OVER A FIXED RATE CHANNEL

(75) Inventors: Alvin Lim; Tan Kien Beng; Eng Yue Ong, all of Singapore (SG)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/049,214

(22) Filed: Mar. 27, 1998

(51) Int. Cl.[7] .............................. H04J 3/24; H04J 3/22; H04B 14/04; H04B 1/66
(52) U.S. Cl. ...................... 370/465; 370/465; 370/473; 370/503; 375/253; 375/240.23; 375/240.28
(58) Field of Search .................................. 370/468, 476, 370/479, 464, 470, 471, 473, 474, 465, 477, 350, 503, 505, 506, 508, 509, 512; 375/253, 240.28, 240.23

(56) References Cited

U.S. PATENT DOCUMENTS

| | | | | |
|---|---|---|---|---|
| 3,862,373 A | * | 1/1975 | Cohen et al. ................ 370/538 |
| 4,891,808 A | | 1/1990 | Williams ..................... 370/112 |
| 5,095,425 A | | 3/1992 | Hesse ........................... 395/350 |
| 5,287,178 A | * | 2/1994 | Acampora et al. ........... 370/474 |
| 5,424,733 A | * | 6/1995 | Fimoff et al. ................. 341/67 |
| 5,487,067 A | | 1/1996 | Matsushige ................. 370/85.7 |
| 5,559,801 A | * | 9/1996 | Lo ............................... 370/501 |
| 5,825,765 A | * | 10/1998 | Menzilcioglu et al. ....... 370/394 |
| 5,974,380 A | * | 10/1999 | Smyth et al. ................ 704/229 |
| 6,104,726 A | * | 8/2000 | Yip et al. .................... 370/468 |
| 6,141,353 A | * | 10/2000 | Li ............................... 370/465 |

\* cited by examiner

*Primary Examiner*—Hassan Kizou
*Assistant Examiner*—Hanh Nguyen
(74) *Attorney, Agent, or Firm*—Skjerven Morrill LLP

(57) ABSTRACT

A method to determine placement of sampled data within a data stream of a fixed rate communication channel is disclosed. The fixed rate communication channel transfers a serial flow of data packets over a serial or parallel communication channel. Each data packet has a header and a data stream. The method for transferring variable rate sampled data to a fixed rate communication channel begins by acquiring a sample of the variable rate sampled data. A data packet in which to place the sample is then determined. A location within the data stream where the sample is to be placed is also determined. A pointer to the location is placed within the header of the data packet. The sample is placed within the location within the data stream of the data packet and the data packet is then transmitted on the fixed rate communication channel.

39 Claims, 4 Drawing Sheets

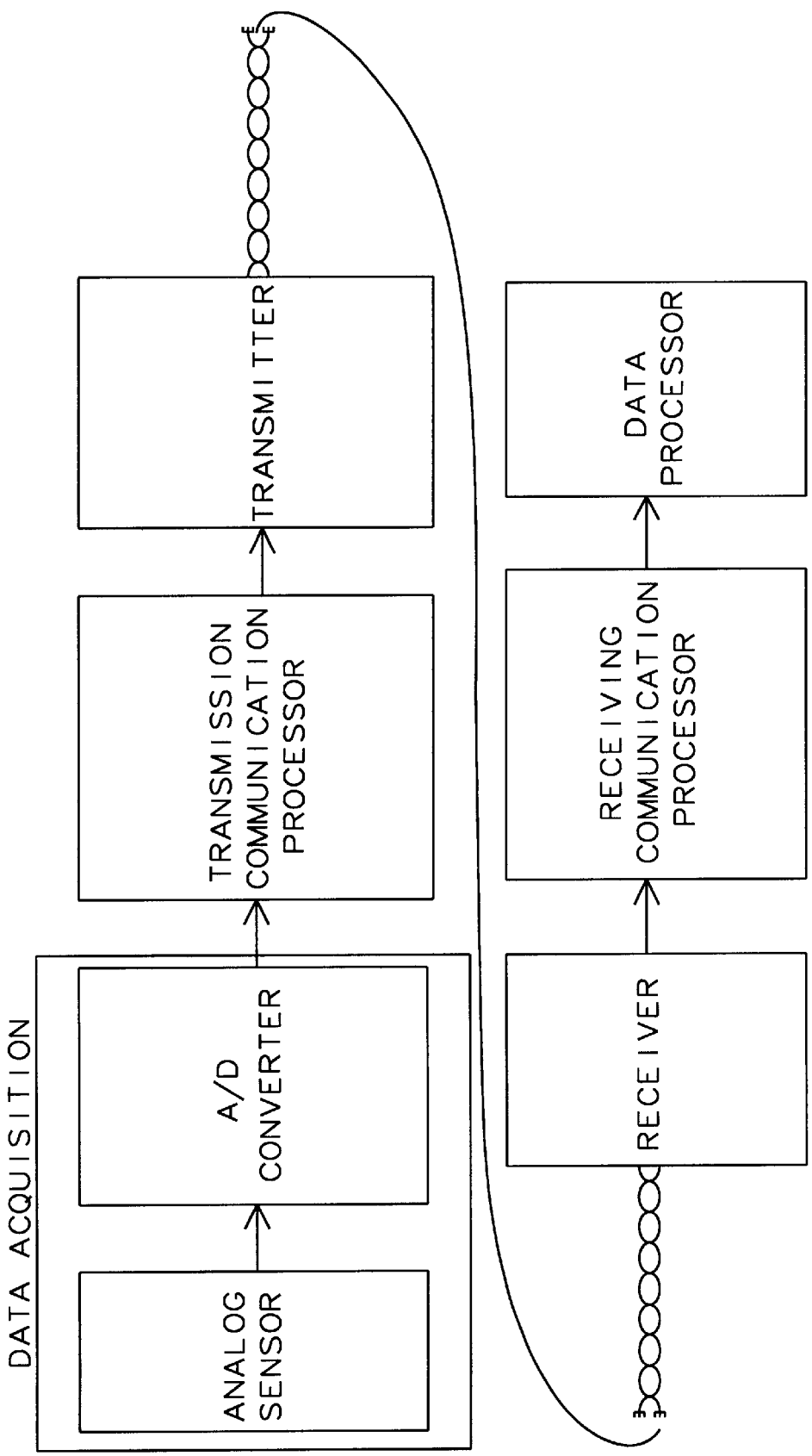
FIG. 1 – Prior Art

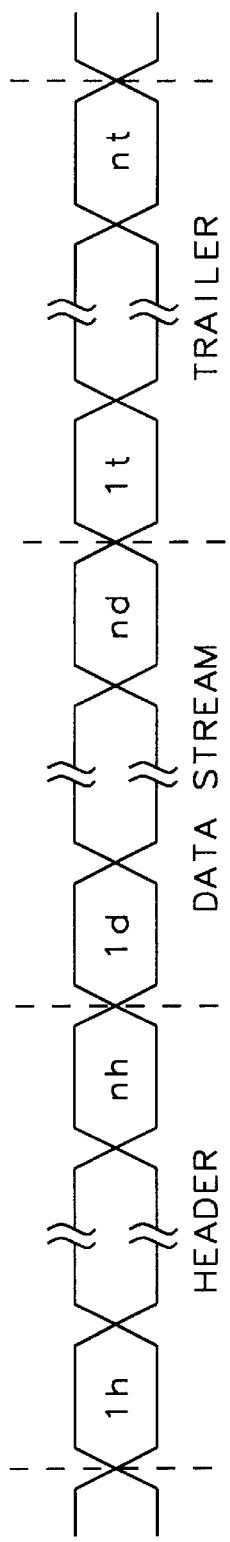
FIG. 2 – Prior Art
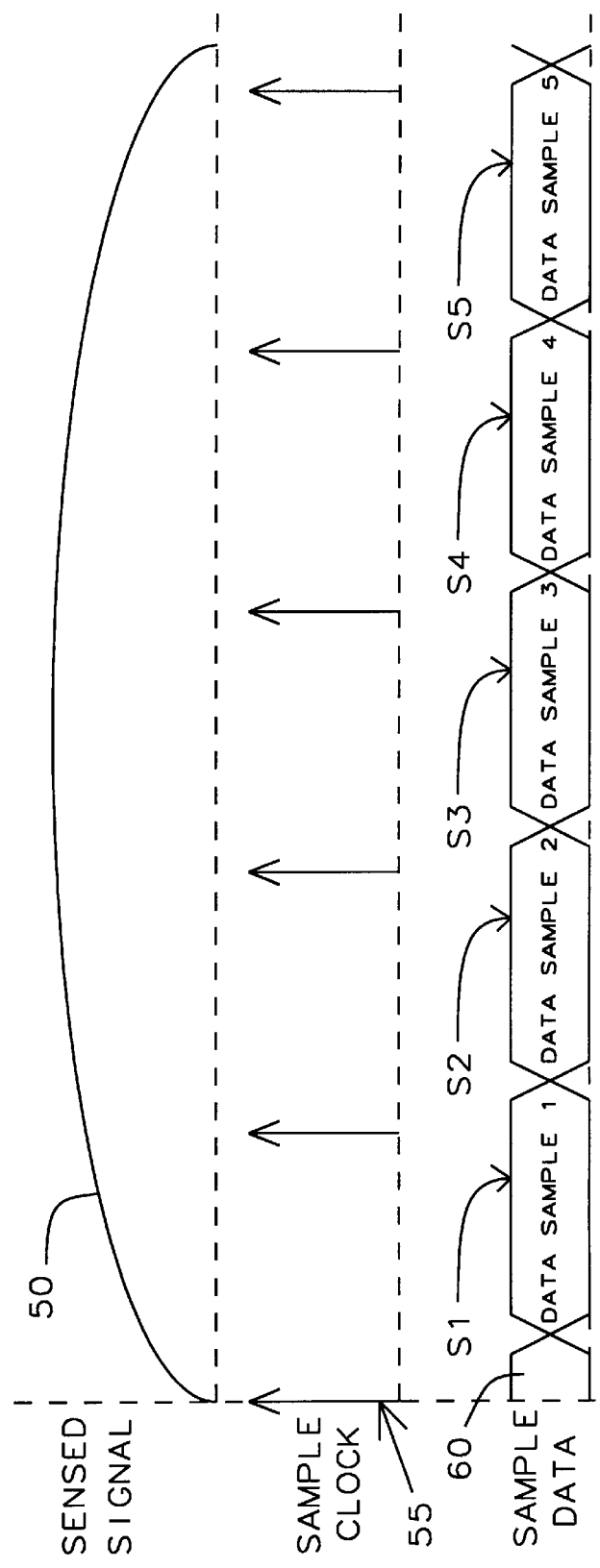
FIG. 3 – Prior Art

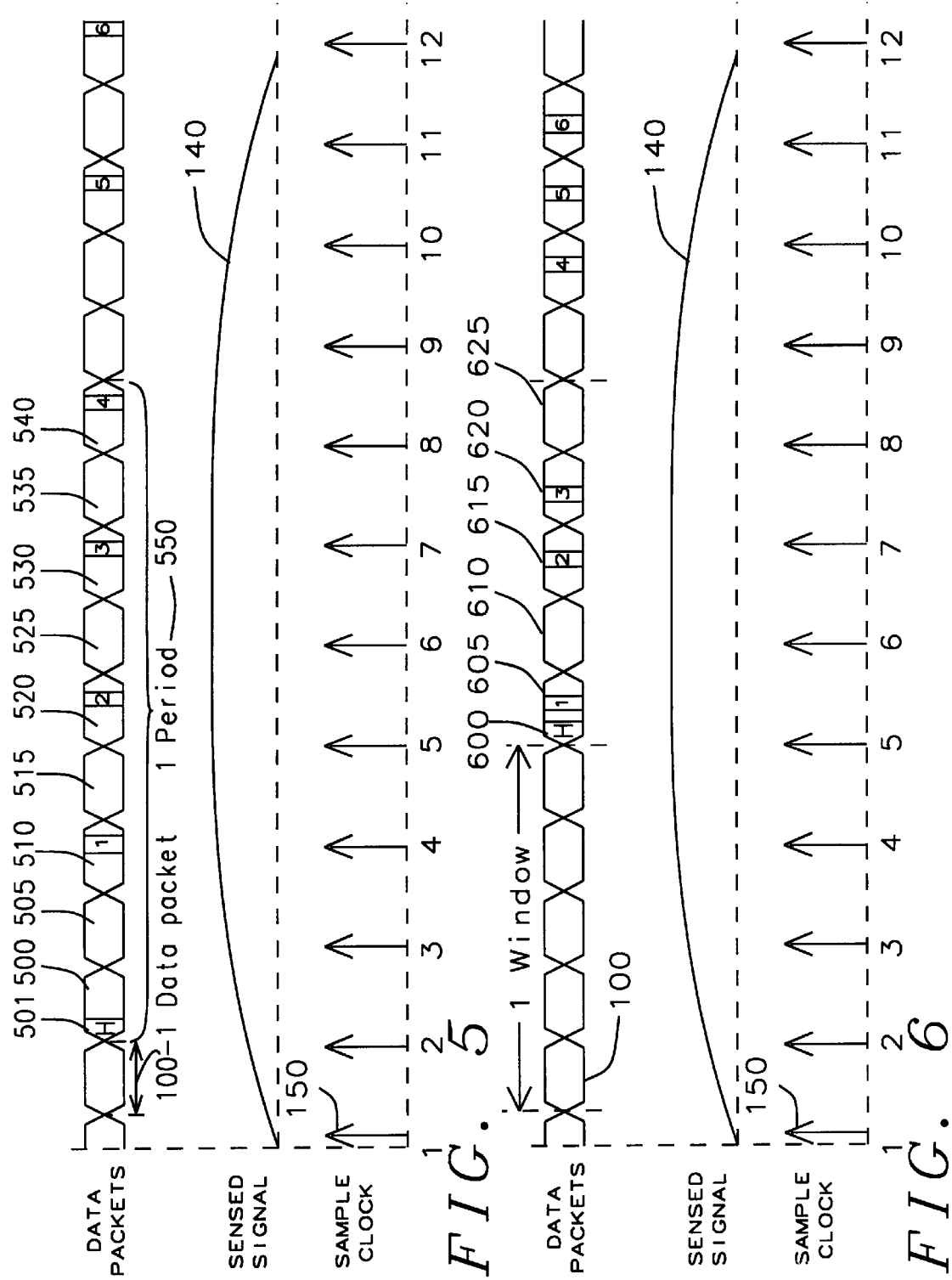

METHODS AND SYSTEM TO TRANSMIT DATA ACQUIRED AT A VARIABLE RATE OVER A FIXED RATE CHANNEL

BACKGROUND OF THE INVENTION

1. Field Of The Invention

This invention relates to the transmission of digital data over a communication channel and more particularly to methods and systems to acquire variable rate data and prepare the variable rate data for transmission on a fixed rate channel.

2. Description of Related Art

The periodic acquisition of data, the accumulation of the data, and transmission of the accumulated data is well known in the art. The data acquisition time is generally not related to the data rate of the transmission system.

Refer now to FIGS. 1, 2, and 3 to understand the status of this related art. In FIG. 1, a data acquisition system will periodically sample an analog signal. This analog signal will be a change in voltage, current, or frequency of an electrical signal as the result of the change in a physical phenomenon such as temperature, velocity, acceleration, pressure, or some other physical phenomena. The analog signal will be converted to a digital code representing the magnitude of the physical phenomena in an analog-to-digital converter. The digital code will be transferred to the transmission processor.

FIG. 3 shows the waveforms of the sampling and conversion to the digital code. The sensed signal 50 is the analog signal that is the result of the physical phenomena to be measured. Periodically, the sample clock will enable a sample and hold circuit that will capture a sample of the level of the sensed signal 50. This sample S1, S2, S3, S4, or S5 of the level of the sensed signal 50 will be converted to the sampled data 60. The conversions of the samples S1, S2, S3, S4, or S5 from the level of the sensed signal 50 will require some period of time. This will mean that the sample S1 will correspond to the data sample 1, the sample S2 will correspond to the data sample 2, the sample S3 will correspond to the data sample 3, etc. While the sample clock 55 is shown as having a regular period, the sampling may have a variable period or actually be asynchronous.

The transmission communication processor of FIG. 1 will receive the sampled data 60 of FIG. 3 and will retain the data until a sufficient amount is accumulated for transmission. The sampled data will be modified to conform to the data format of the communication channel.

The data will then be transmitted by the transmitter to the receiver. The receiving communications processor will extract the sampled data and transfer the sampled data to the data processor. The data processor will further manipulate the sampled data as required.

FIG. 2 shows a general structure of a communication protocol. The communication protocol will generally be a serial flow of digital data overtime. The interface may actually be a serial interface to transfer the digital data over a single communication connection or the interface may be a parallel interface composed of multiple communication connections to transfer bytes or words of the digital data.

The digital data will form a data packet having a header, a data stream and optionally a trailer. The header will contain command and control information such as the length of the data stream, error detection codes, and source and destination information. The data stream will contain the actual sample data accumulated in transmission communication processor. The optional trailer may contain redundant codes from the header, or more error detection codes as well as end of message codes.

The data packet structure allows for communication between physical entities to be maintained independent of the sampling rate of the data acquisition system. However, this causes a problem for synchronizing the data sampling with the rate of the data transmission.

U.S. Pat. No. 5,487,067 (Matsushige) discloses a data communication apparatus to allow audio equipment to communicate. A master audio device and a plurality of slave devices are connected on ring network- The digitized audio is transferred between devices formatted as frames. Each frame has a plurality of data blocks. The data blocks contain the information of the sampled audio signals. The master of the slave devices will communicate the "set-up" data prior to the digital audio on the network to provide control.

Data blocks that are to be received by a slave device will be extracted from the ring network and replaced with data from the slave device itself. The ring network will use acknowledged standard protocols U.S. Pat. No. 4,891,808 (Williams) discloses a self-synchronizing time division multiplexer. A plurality of input data signals is to be allocated to series of time divisions. The multiplexer will select the appropriate input data signal for transmission at the appropriate time division.

U.S. Pat. No. 5,095,425 (Hesse) describes a method for the transmission of data from one station to another by way of a data bus. Several stations are connected to the data bus in parallel. The stations will access the bus independently for the transmission of the data. There will be a signal identifying that the data bus is "occupied."

Other stations will not know the clock frequency of the stations and synchronization is achieved by transmission of signals during fixed periods.

Since the data, bus indicates occupancy of the data bus, waiting times and special control sequences are not necessary or are very simple. The occupancy signals from the transmitting station will define the entire period from the data transmission.

SUMMARY OF THE INVENTION

An object of this invention is to provide a method to transmit sampled data acquired at the variable rate over a communication channel having a fixed transmission rate.

Another object of this invention is to provide a method to determine placement of the sampled data within a data stream of the communication channel. The fixed rate communication channel transfers a serial flow of data packets over a serial or parallel communication channel. Each data packet has a header and a data stream.

To accomplish these and other objects the method for transferring variable rate sampled data to a fixed rate communication channel comprises the steps of:

a. acquiring a sample of the variable rate sampled data;

b. determining a data packet in which to place the variable rate sampled data;

c. determining a location within the data stream in which to place the variable rate sampled data;

d. communicating the location within the data stream of the variable rate sampled data by a technique such as placing a pointer to the location within the header of the data packet.

e. placing the variable rate sampled data within the location within the data stream of the data packet;

f. transmitting the data packet on the fixed rate communication channel from a transmitter;

g. receiving the data packet on the fixed rate communication channel at a receiver; and h. extracting at the receiver the variable rate sampled data from the location within the data packet; and i. continuously repeating the aforementioned steps at each sampling of the variable rate sampled data.

A second embodiment of the method for transferring variable rate sampled data to a fixed rate communication channel will have a plurality of data packets occupying a period. A fixed number of the variable rate sampled data is will be placed within the period at fixed locations within the data streams of the plurality of data packets within the period.

The method for transferring variable rate sampled data to a fixed rate communication channel will have the additional steps of:

a. defining the period and the fixed number of variable rate sampled data; and b. placing a definition of the period and the fixed number of variable rate data samples with the header of a first data packet of the plurality of data packets. The location of the sampled data will be fixed within the period.

A third embodiment of the method for transferring variable rate sampled data to a fixed rate communication channel has a plurality of data packets occupying a window. A specified number of variable rate sampled data will be transferred within the window.

The method for transferring variable rate sampled data to a fixed rate communication channel will additionally have the steps of:

a. defining a number of data packets within the window;

b. specifying the number of variable rate sampled data within the window; and c. placing a definition of the window and the specified number of variable rate sampled data within the header of the first data packets of the plurality of data packets.

The variable rate sample data will be retained to be accumulated before being placed within the data stream.

BRIEF DESCRIPTION OF THE DRAWINGS

FIG. 1 is a block diagram of a data acquisition system and data communication system of the prior art.

FIG. 2 is a timing diagram of the components of a fixed rate communication channel of the prior art.

FIG. 3 is a timing diagram of the acquisition of variable rate sampled data of the prior art.

FIG. 5 is a timing diagram a second embodiment of the preparation of variable rate sampled data for transmission on a fixed rate communication channel of this invention.

FIG. 6 is a timing diagram of a third embodiment of the preparation of variable rate sampled data for transmission on a fixed rate communication channel of this invention.

DETAILED DESCRIPTION OF THE INVENTION

Figure 4:
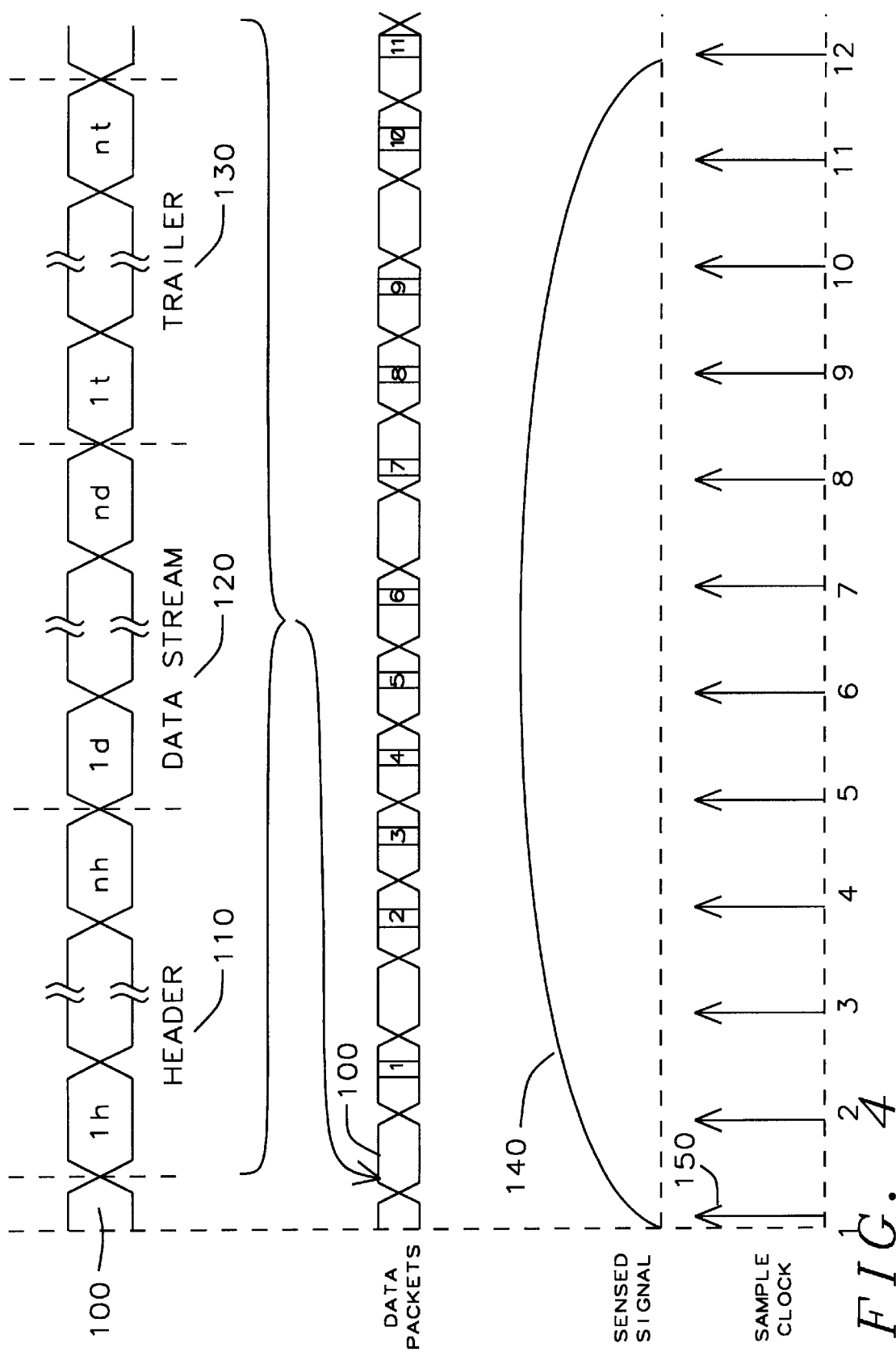
FIG. 4 is a timing diagram of a first embodiment of the preparation of variable rate sampled data for transmission on a fixed rate communication channel of this invention.

The system of this invention will have a structure as shown in FIG. 1. The sampled data will be created in the data acquisition system. The sampled data will be transferred as above described to the transmission communication processor.

Refer now to FIG. 4 for a first embodiment of this invention. The communication protocol will have a serial flow of data packets. Each data packet will have a header, a data stream, and an optional trailer as above described.

The sample clock will sample and hold a small period of the sensed signal. The analog-to-digital converter will convert the sampled sensed signal to the sampled data.

The transmission communication processor will determine the next available data packet at which to place the sampled data. The transmission communication processor will additionally determine the location within the data stream of the data packet at which to place the sampled data. The header of the selected data packet will receive a pointer indicating the location within the data stream of the data packet containing the sampled data.

The series of sampled data created by the sample clock 150 are indicated by the series 1, 2, 3, . . . , 12. The locations for each sampled data will be established as the next available location within the data stream. As can be seen the data packets will contain the series 1, 2, 3,... , 12 of the sampled data at the locations determined by the transmission communication processor.

At the receiving end, the receiver communication processor will extract the location from the header 110 of the data packets 100. The receiver communication processor will wait for the appropriate location of the data stream to be received, extract the sampled data, and transfer the sampled data to the data processor.

Refer now to FIG. 5 for a second embodiment of the preparation of the variable rate sampled data for transmission on the fixed rate communication is channel. The sample clock 150 will sample and hold the sensed signal 140 to acquire the sampled data as above described. The series 1, 2, 3, . . . , 12 of the sampled data will be created for transmission.

The transmission communication processor will divide the flow of the data packets 100 into periods 550, where a fixed number of data packets are allocated to a period 550. The location within the data stream of the data packet 100 where the sampled data 1, 2, 3, . . . , 12 is placed, is fixed.

As can be seen in FIG. 5, a period 550 is defined as nine data packets 500, 505, 510, 515, 520, 525, 530, 535, and 540 containing four sets of the sampled data 1, 2, 3, and 4. Each of the four sampled data sets 1, 2, 3, and 4 will be deterministically placed within the same location within the data stream of the data packets 500, 505, 510, 515, 520, 525, 530, 535, and 540. In the case shown, data samples 1, 2, 3, and 4 will be located in data packets 510, 520, 530, and 540, while the data packets 500, 505, 515, 525,and 535 contain no data. Additionally, the sampled data 1, 2, 3, and 4 will occupy the same locations within the data streams of each data packet 510, 520, 530, and 540.

The generalized form for the determination of the number of sampled data 1, 2, 3, 4, 5, and 6 within the period of the fixed rate communication channel is similar to the method for synthesizing a periodic frequency for a reference frequency as described in U.S. Pat. No. 5,705,945 (Wee) assigned to the same assignee as this invention and herein incorporated by reference.

The ratio of the frequency ($F_T$) of the transmission of the data packets of the fixed rate communication channel to the frequency ($F_S$) of the sampling clock 150 is the following formula:

$$\frac{F_T}{F_S} = A + \frac{b}{c} = \frac{Ac+b}{c}$$

where:
A is the integer portion of the ratio.
c is the lowest common denominator of the ratio.
b is the numerator of the fraction for with the lowest common denominator.

The total number of data packets 100 per period 550 will be (Ac+b). The number of sampled data 1, 2, 3, 4, 5, and 6 to be placed in the period 550 will be C.

For example, if the frequency of the data packets 100 of the fixed rate communication channel is 2304 data packets per second, and the data sampling rate is 1024 sampled data per second, then:

$$\frac{F_T}{F_S} = \frac{2304}{1024} = 2 + \frac{256}{1024}$$

By applying the technique of Wee, the ratio of the frequency ($F_T$) of the transmission of the data packets of the fixed rate communication channel to the frequency ($F_S$) of the sampling clock 150 is:

$$\frac{F_T}{F_S} = 2 + \frac{256}{1024} = 2 + \frac{2*2*2*2*2*2*2*2}{2*2*2*2*2*2*2*2\times 2} = 2 + \frac{1}{4}.$$

Therefore, A=2, b=1, and c=4. This will make the period 550 of nine data packets 500, 505, 510, 515, 520, 525, 530, 535, and 540 each, containing four sampled data 1, 2, 3, and 4.

The determined locations will be transmitted in the header of the first data packet 500 to the receiver communication processor. This deterministic process will simplify the extraction of the sampled data 1, 2, 3, and 4 and in the receiver communication processor.

Refer now to FIG. 6 for a third embodiment of the preparation of the variable rate sampled data for transmission on the fixed rate communication channel. As before described, the sample clock 150 will sample and hold the sensed signal 140 to acquire the sampled data. The series data 1, 2, 3, . . . , 12 of sampled data will be created for transmission.

The transmission communication processor will divide the serial flow of data packets into windows. Each window will contain a fixed number of the data packets and a fixed number of data packets. The fixed number of sampled data will be placed in non-fixed locations within each window. The number of sampled data to be placed within the window will be accumulated and retained in a register or memory. At the time of the next available window, the sampled data will be placed in locations determined by the transmission communication processor.

A pointer for each sampled data will be placed in the header of the first data packet of each window, thus simplifying the extraction of the sampled data by the receiver communication processor. As can be seen three sampled data 1, 2, and 3 will be placed in the first available window 610. The sampled data 1, 2, and 3 will be placed in the data packets 605, 615, and 620. The data packets 610 and 625 will remain empty.

Alternatively, the placement of the sampled data 1, 2, and 3 within each data packet 100 may be predefined, while the specific data packets 605, 610, 615, 620, and 625 containing sampled data 1, 2, and 3 are pointed to by data within the header 600 of the first data packet 605 of the window. Thus the sampled data 1, 2, and 3 will be placed in the in the data packets 605, 615, and 620, while the data packets 610 and 625 will remain empty. The status of each data packet packets 605, 610, 615, 620, and 625 will be placed in the header 600 of the first data packet 605.

The placement of the sampled data is not deterministic and the sampled data will be conveniently placed within the data stream of the data packets.

Within the protocol of the fixed rate communication channel, several method of transfer of control information are possible to insure transfer of the location of the transmitted sampled data and the successful extraction of the sampled data at the receiver.

Since the receiver will have to count the number of data packets being received to determine which data packets will contain data, a synchronization pulse can be placed on the fixed rate communication channel by the controlling unit. The controlling unit may be either the transmitter of the sampled data or the receiver of the sampled data.

An alternative method would be to place "tag bits" in the header of each data packet indicating the presence, location, and validity of the sampled data within the data packet. The receiver would extract the "tag bits" for the header from each data packet. The receiver would then interpret the "tag bits" indicating the location within the data packet of the sampled data.

Another alternative method is a "handshaking method". The receiver would transmit a request signal from the transmitter demanding sampled data. The message would contain the number of sampled data and their locations within the stream of data packets according to the above described methods for determining the location of the sampled data.

While this invention has been particularly shown and described with reference to the preferred embodiments thereof, it will be understood by those skilled in the art that various changes in form and details may be made without departing from the spirit and scope of the invention.

The invention claimed is:

1. A method for transferring variable rate sampled data to a fixed rate communication channel comprising the steps of:
   a) providing a fixed rate communications channel, wherein said communication channel transfers a serial flow of data packets at a fixed rate, each data packet has a header and a data stream;
   b) acquiring at a variable rate a sample of said variable rate sampled data;
   c) determining at least one data packet in which to place said sample of said variable rate sampled data;
   d) determining a location within the data stream of the determined data packet in which to place said sample of the variable rate sampled data
   e) communicating said location of said sample of the variable rate sampled data within said data packets;
   f) placing said sample of the variable rate sampled data within said location within a data stream of said data packets;
   g) transmitting within the communication channel said data packets;
   h) receiving within the communication channel said data packets;
   i) determining the location of said sample of the variable rate sampled data in the received data packets based on said communicated location;
   j) extracting the sample of the variable rate sampled data from said location within the data stream of the data packets; and
   k) continuously repeating said aforementioned steps at each sampling of said variable rate sampled data.

2. The method of claim 1, wherein said fixed rate communication channel is a serial communication channel.

3. the method of claim 1, wherein said fixed rate communication channel is a parallel communication channel.

4. The method of claim 1 wherein a plurality of data packets occupy a period and a fixed number of variable rate sampled data will be placed within said period at fixed locations within the data streams of said plurality of data packets within said period.

5. The method of claim 4 further comprising the steps of:
   defining said period and said fixed number of variable rate sampled data.

6. The method of claim 5 wherein the defining is accomplished by the steps of:

a) solving the formula:

$$\frac{F_T}{F_S} = A + \frac{b}{c} = \frac{Ac+b}{c}$$

where:
F$_T$ is a frequency of transmission of the plurality of data packets,
F$_S$ is a frequency of sampling of the variable rate sampled data,
A is the integer portion of the ratio of the frequency of transmission of the plurality of data packets versus the frequency of sampling of the variable rate sampled data,
c is the lowest common denominator of the ratio of the frequency of transmission of the plurality of data packets versus the frequency of sampling of the variable rate sampled data,
b is a residue of the ratio of the frequency of transmission of the plurality of data packets versus the frequency of sampling of the variable rate sampled data;

b) defining the period as (Ac+b); and c) defining the number of samples of variable rate sampled data within the period as lowest common denominator of the ratio of the frequency of transmission of the plurality of data packets versus the frequency of sampling of the variable rate sampled data.

7. The method of claim 5 wherein said location is fixed within said period.

8. The method of claim 1 wherein a plurality of data packets occupies a window and a specified number of variable rate sampled data will be transferred within said window.

9. The method of claim 8 further comprising the steps of:
a) defining a number of data packets within said window;
b) specifying the number of samples of the variable rate sampled data with said window; and
c) placing a definition of said window and said specified number of samples of the variable rate sampled data within the header of the first data packets of said plurality of data packets.

10. The method of claim 9 further comprising the step of retaining said samples of the variable rate sample data before placing said variable rate sampled data within said data stream.

11. The method of claim 1 wherein communicating said location is placing a definition of said period and the fixed number of samples of the variable rate sampled data with the header of a first data packet of said plurality of data packets.

12. The method of claim 1 wherein communicating said location is accomplished by a receiving station attached to said communication channel transferring a demand message to designating said location to a transmitting station that will place said samples of the variable rate sampled data at said location within said data packet.

13. The method of claim 1 wherein communicating said location is transmitting a synchronizing signal on the communication channel to initialize counters to indicate said location.

14. A system for acquiring data sampled at a variable rate, to prepare said data sampled at a variable rate for transfer to a fixed rate communication channel, and to transmit said data sampled at a variable rate on said fixed rate communication channel, and said system comprises:
a) a data acquisition means to sample a measurement of a physical phenomena and to convert said measurements to said data sampled at a variable rate;

b) a transmission communications processor means connected to said data acquisition means to prepare said data sampled at a variable rate for transmission, whereby transmission on said fixed rate communication channel is accomplished by transmitting a serial flow of data packets, each data packet having a header and a data stream, and whereby said preparing said data sampled at a variable rate comprises the steps of:
determining at least one data packet in which to place said sampled data,
determining a location within the data stream of said determined data packet in which to place said sampled data,
placing a pointer to said location within the header of said determined data packet, and
placing said sampled data within said location within said data stream of said determined data packet; and c) a transmission means connected to said communication processor means to transmit data packets.

15. The system of claim 14 wherein said fixed rate communication channel is a serial communication channel.

16. The system of claim 14 wherein said fixed rate communication channel is a parallel communication channel.

17. The system of claim 14 wherein a plurality of data packets occupy a period and a fixed number of said data sampled at a variable rate will be placed within said period at fixed locations within the data streams of said plurality of data packets within said period.

18. The system of claim 17 whereby preparing said data packets further comprises the step of:
defining said period and said fixed number of sampled data.

19. The system of claim 18 wherein the defining is accomplished by the steps
a) solving the formula:

$$\frac{F_T}{F_S} = A + \frac{b}{c} = \frac{Ac+b}{c}$$

where:
F$_T$ is a frequency of transmission of the plurality of data packets,
F$_S$ is a frequency of sampling of the variable rate sampled data,
A is the integer portion of the ratio of the frequency of transmission of the plurality of data packets versus the frequency of sampling of the variable rate sampled data,
c is the lowest common denominator of the ratio of the frequency of transmission of the plurality of data packets versus the frequency of sampling of the variable rate sampled data,
b is a residue of the ratio of the frequency of transmission of the plurality of data packets versus the frequency of sampling of the variable rate sampled data;

b) defining the period as (Ac+b); and c) defining the number of variable rate sampled data within the period as lowest common denominator of the ratio of the frequency of transmission of the plurality of data packets versus the frequency of sampling of the variable rate sampled data.

20. The system of claim 18 wherein said location is fixed within said period.

21. The system of claim 14 wherein a plurality of data packets occupy a window and a specified number of said data sampled at a variable rate will be transferred within said window.

22. The system of claim 21 whereby preparing said data packets further comprises the steps of:
   a) defining a number of data packets within said window;
   b) specifying the number of said data sampled at a variable rate with said window: and
   c) placing a definition of said window and said specified number of said data sampled at a variable rate within the header of the first data packet of said plurality of data packets.

23. The system of claim 22 whereby said preparing further comprises the step of retaining said data sampled at a variable rate before placing said data sampled at a variable rate within said data stream.

24. The system of claim 14 wherein communicating said location is placing a definition of said period and the fixed number of variable rate sampled data with the header of a first data packet of said plurality of data packets.

25. The system of claim 14 wherein communicating said location is accomplished by a receiving station attached to said communication channel transferring a demand message to designating said location to a transmitting station that will place said variable rate sampled data at said location within said data packet.

26. The system of claim 14 wherein communicating said location is transmitting a synchronizing signal on the communication channel to initialize counters to indicate said location.

27. A communication system to prepare a period sampling of acquired data for transmission on a fixed rate communication channel, whereby said fixed rate channel transmits a serial flow of data packets, wherein each data packet includes a header and a data stream, and whereby preparing said period sampling of acquired data comprises the steps of:
   a) receiving said acquired data from a data acquisition means;
   b) determining a data packet in which to place said acquired data;
   c) determining a location within said data stream in which to place said acquired data;
   d) communicating said location within said data stream of said data packet;
   e) placing said acquired data within said location within said data stream of said data packet; and
   f) transferring said data packet to a transmitting means for transmission of said acquired data.

28. The system of claim 27 wherein said fixed rate communication channel is a serial communication channel.

29. The system of claim 27 wherein said fixed rate communication channel is a parallel communication channel.

30. The system of claim 27 wherein a plurality of data packets occupy a period and a fixed number of acquired data will be placed within said period at fixed locations within the data streams of said plurality of data packets within said period.

31. The system of claim 30 whereby preparing said data packets further comprises the step of:
   defining said period and said fixed number of acquired data.

32. The system of claim 30 wherein the defining is accomplished by the steps of:
   a) solving the formula:

$$\frac{F_T}{F_S} = A + \frac{b}{c} = \frac{Ac+b}{c}$$

where:
   $F_T$ is a frequency of transmission of the plurality of data packets,
   $F_S$ is a frequency of sampling of the acquired data,
   A is the integer portion of the ratio of the frequency of transmission of the plurality of data packets versus the frequency of sampling of the acquired data,
   c is the lowest common denominator of the ratio of the frequency of transmission of the plurality of data packets versus the frequency of sampling of the acquired data,
   b is a residue of the ratio of the frequency of transmission of the plurality of data packets versus the frequency of sampling of the acquired data;
   b) defining the period as (Ac+b); and
   c) defining the number of acquired data within the period as lowest common denominator of the ratio of the frequency of transmission of the plurality of data packets versus the frequency of sampling of the acquired data.

33. The system of claim 31 wherein said location is fixed within said period.

34. The system of claim 27 wherein a plurality of data packets occupy a window and a specified number of acquired data will be transferred within said window.

35. The system of claim 34 whereby preparing said data packets further comprises the steps of:
   a) defining a number of data packets within said window;
   b) specifying the number of acquired data with said window; and
   c) placing a definition of said window and said specified number of acquired data within the header of the first data packet of said plurality of data packets.

36. The system of claim 35 whereby said preparing further comprises the step of retaining said acquired data before placing said acquired data within said data stream.

37. The system of claim 27 wherein communicating said location is placing a definition of said period and the fixed number of variable rate sampled data with the header of a first data packet of said plurality of data packets.

38. The system of claim 27 wherein communicating said location is accomplished by a receiving station attached to said communication channel transferring a demand message to designating said location to a transmitting station that will place said acquired data at said location within said data packet.

39. The system of claim 27 wherein communicating said location is transmitting a synchronizing signal on the communication channel to initialize counters to indicate said location.

* * * * *